United States Patent [19]

Pellegrini et al.

[11] Patent Number: 4,860,906
[45] Date of Patent: Aug. 29, 1989

[54] GLASS CONTAINER WITH SAFETY COATING

[75] Inventors: Louis Pellegrini, Oak Brook; Melvin F. Roberts, Niles, both of Ill.

[73] Assignee: Bloomfield Industries, Inc., Chicago, Ill.

[21] Appl. No.: 96,624

[22] Filed: Sep. 14, 1987

[51] Int. Cl.⁴ .......................... A47G 19/14; A47J 31/58
[52] U.S. Cl. .............................. 215/12.2; 215/DIG. 6; 428/34.7
[58] Field of Search ................ 215/1 C, 12.2, DIG. 6, 215/1 R; 528/10; 428/35, 34.7; 427/389.7

[56] References Cited

U.S. PATENT DOCUMENTS

| | | | |
|---|---|---|---|
| 3,094,446 | 6/1963 | Burdick et al. | 528/10 X |
| 3,325,440 | 6/1967 | Johannsen | 528/10 X |
| 3,529,035 | 9/1970 | Lamoreaux | 215/DIG. 6 X |
| 3,815,865 | 6/1974 | Campagna | 215/12.2 X |
| 3,825,142 | 7/1974 | Campagna | 215/1 C |
| 3,859,117 | 1/1975 | Erchak et al. | 215/1 C |
| 4,061,704 | 12/1977 | Barter | 528/10 X |
| 4,098,934 | 7/1978 | Brockway et al. | 215/DIG. 6 X |
| 4,133,923 | 1/1979 | Blunt | 215/12.2 X |
| 4,161,556 | 7/1979 | Lenard et al. | 428/35 X |
| 4,220,682 | 9/1980 | Macedo et al. | 428/410 X |
| 4,268,554 | 5/1981 | Gras | 427/389.7 X |
| 4,315,573 | 2/1982 | Bradley et al. | 215/12.2 |
| 4,370,385 | 1/1983 | Yoshida et al. | 428/35 X |

FOREIGN PATENT DOCUMENTS

| | | | |
|---|---|---|---|
| 131154 | 10/1981 | Japan | 215/12.2 |
| 7309649 | 1/1974 | Netherlands | 215/1 C |
| 932921 | 7/1963 | United Kingdom | 215/1 C |

*Primary Examiner*—Sue A. Weaver
*Attorney, Agent, or Firm*—Lee & Smith

[57] ABSTRACT

A glass container for holding hot liquids and having a shatter resistant plastic coating which resists fragmenting of the glass and which is serviceable for containers that are subjected to intermittent heating and cooling during use.

4 Claims, 1 Drawing Sheet

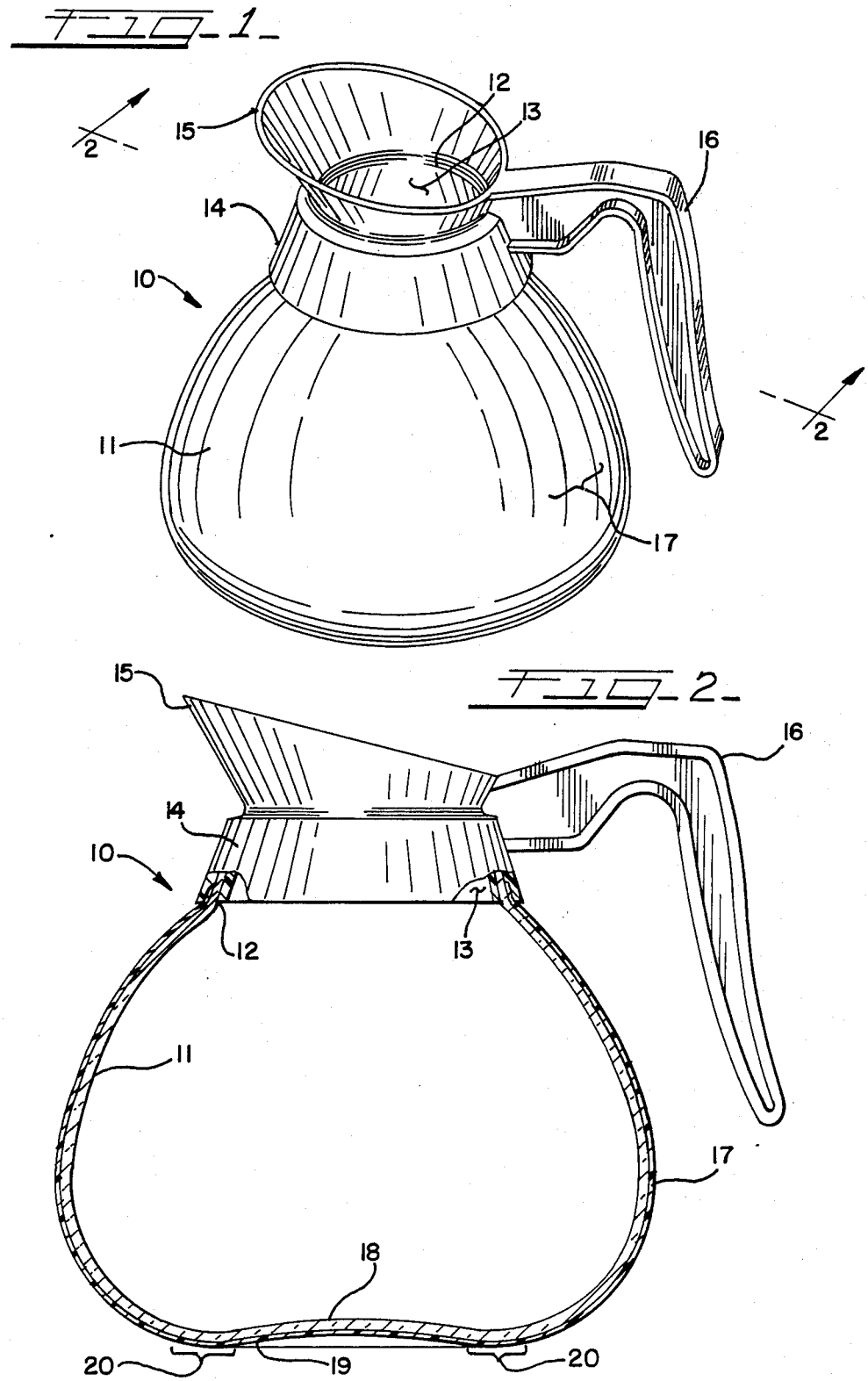

GLASS CONTAINER WITH SAFETY COATING

BACKGROUND OF THE INVENTION

The invention generally relates to safety protective coatings for glass containers to resist breakage and shattering. More particularly, the invention is directed to providing a safety coating for a coffee decanter that is subjected to intermittent heating.

Serving heated beverages from decanters, such as used for hot coffee, requires care to be taken so that rough treatment and breakage of the decanter do not occur. While the prevention of injuries from broken glass and hot coffee is a normal concern of consumers for use in the home, the problems are multiplied when coffee, or other hot beverages, are served to the public in restaurants or handled in busy kitchens by employees. Even great care and warning labels sometimes do not avoid accidental breakage. Coffee decanters used in restaurant facilities are subjected to excessively rough handling and oftentimes are knocked against one another, as well as against metal countertop edges and other pieces of restaurant equipment. Not only can injury result from skin contact with the hot liquid but also from the shards of glass that may be strewn about when a decanter is shattered.

Coffee decanters are required to have a relatively thin construction to avoid cracking from drastic expansion differences at the interior versus the exterior because they are subjected to quick changes in temperature from ambient conditions to holding heated coffee up to about 205° F. Should a coffee decanter be made with thick walls, heat fracturing might occur due to differences in surface expansion inside to outside. Furthermore, decanters are often placed upon warming plates that may have surface or heating element temperatures exceeding 500° F. In the event that an inattentive employee allows a decanter to "boil dry", temperatures in excess of 500° F. may be reached at the lower wall surfaces of the decanter. Accordingly, a protective coating must be able to withstand quick temperature changes and elevated temperatures in addition to providing for the break and shatter resistance that has long been sought in the industry.

By necessity, coffee decanters, and other hot beverage holding containers, have relatively narrow open neck portions to minimize heat loss in order to keep the beverages warm and to provide for easy pouring. A common bulbous bowl shpae has long been used in the industry. This design also places the center of the gravity very low and makes it less likely that spillling could occur while carrying the decanter from a coffee warmer to, for example, the table side in a restaurant where the coffee is to be poured by the waiter into a cup. The thin, shell-like wall configuration also allows for even and rapid heat conduction to maintain the beverage at an appropriate temperature when rested upon a warming plate between servings.

The prior art has utilized coatings to protect pop bottles from breakage such as disclosed in U.S. Pat. No. 3,825,142 to Campagna and U.S. Pat. No. 3,859,117 to Erchak et al. However, the problems encountered with glass decanters that are subjected to intermittent heating and drastic temperature changes are not addressed in the prior art.

Additional prior art teachings of protective coatings for glass are disclosed in U.S. Pat. No. 4,161,556 to Lenard et al., U.S. Pat. No. 4,220,682 to Macedo et al., U.S. Pat. No. 4,268,554 to Gras, and U.S. Pat. No. 4,289,816 to Fogelberg et al. Another teaching providing for coating glass surfaces, such as soda bottles or lightbulbs, is shown in U.S. Pat. No. 3,529,035 to Lamoreaux. In the Lamoreaux invention, a silicone elastomeric coating is used to prevent shattering when the glass is broken. The Lamoreaux patent, however, does not show or consider providing a protective coating that may be used on liquid-holding glass containers which are subjected to intermittent heating and cooling during use, or that is capable of resisting shattering after a container has been "boiled dry" on a heating plate and remains on the plate for a substantial period of time.

Many overlapping concerns with container breakage are found in other areas of use, such as in chemical laboratories where glass containers similar to coffee decanters are used. A long-sought advance in the art of safety protection in the laboratory environment has been to provide for a coating material for glassware containers that resists breakage and substantially eliminates shattering should a blow severe enough to cause breakage occur. These concerns must also be addressed in connection with keeping the coating viable even after experiencing temperature fluctuations like those encountered in coffee brewing procedures.

In the field of glass containers for heated liquids a long-sought goal has been to achieve a safety coating which will also serve as a tough, elastomeric envelope or pouch to confine shards of glass in the event the glass container is broken. While it is desirable that the elastomeric envelope not leak in the event of breakage of the glass container, minor leakage may be tolerated as long as fragments of glass are confined and spewing of heated liquid is avoided in order to prevent personal injury.

Of particlar concern to the restaurant and food service industry is that a protective and safety coating should meet federal Food and Drug Administration food grade material standards. Further, it is important that the safety coating be transparent so that the contents of the decanter may be readily observed by the restaurant employee in order to monitor the amount remaining and to distinguish one beverage from another. The safety coating should not yellow or otherwise become less transparent with age, and it must be non-flammable. Also, the safety coating must not age harden to the point that it becomes brittle and subject to shattering.

The answer to the forgoing problems is not simply achieved by merely creating a shock absorber layer, such as provided by plastic films, foams, or epoxy resins coatings of the thermoset variety as shown in U.S. Pat. No. 4,351,573 to Bradley et al. While a certain degree of thermal shock resistance is provided by these coating materials, the prior art uses have not included applications to "hot-type" containers.

With the need for glass containers that are usable for microwave cooking, it has sometimes been desirable that a coating, such as an epoxy resin, have the property of rupturing, and therefore being frangible. This property is critical for certain types of glass food containers, along with thermal resistance for microwave cooking, because any rupture of the glass wall necessarily ruptures the frangible coating so that leakage may be discerned in order to avoid contamination. Contrarily, for hot beverage containers used in the food services industry, or in the consumer's home kitchen, an important concern has been to prevent the coating from rupturing with the decanter. Teachings of frangible coatings to permit detection of leakage and contamination are otherwise concerned with the problems in containerized foods for sale on the grocery store shelf and not with the problems of holding or serving hot liquid in containers. As a result, this form of prior art protective glass coating is inherently inapplicable to the problems our present invention solves.

A shatter-resistant plastic coating for glass containers used to hold liquids while being subjected to intermittent heating and cooling, has been lacking in the prior art. Further, the art has failed to provide plastic coated glass containers for liquids that resist shattering after having been boiled dry on a warming plate, or heating element, and left for a substantial period of time. Decanters for heated beverages, such as used for coffee and tea, employing silicone rubber coatings to achieve shatter-resistance, have not been known in the glass container industry.

BRIEF SUMMARY OF THE INVENTION

According to the invention there is provided a glass container coated with an elastomeric plastic having improved resistance to shock, breakage and fragmentation, and exhibiting substantial heat stability in that the coating is capable of enduring rapidly fluctuating temperature over a relatively wide range. The coated glass container substantially eliminates shattering should breakage occur. The coating may extend over a major portion of the glass container and has a substantially constant thickness throughout.

Although the invention will be described with reference to a hot beverage container, and specifically a coffee decanter of the type commonly used in restaurants and fast food establishments, it should be understood by those skilled in the art that the invention also has application wherever safety coated glass containers are desired, including laboratory environments and in the household.

The coating according to the invention is formed of a solid elastomeric plastic material adhered to the exterior surface of the glass container and is preferably under tension whereby to offer shatter resistance by being fragment-retentive should glass breakage occur. The thickness of the plastic coating affords high impact resistance to protect the container from breakage while at the same time allowing for good thermal conductivity in order to maintain a beverage inside the glass container warm while on a warming plate.

In a primarily intended form the invention provides a glass container that is coated from the bottom to almost the top pour spout. Ordinarily, substantially the entire exposed surface of a container is coated, but the invention also includes a glass container having a safety coating applied to selected portions of the outer surfaces, for example on the bottom surface, in order to provide shock resistance at the bottom during placement and removal of the container from a resting surface, such as a warming plate. It will be appreciated that a glass container may have any or all of its surfaces covered with a safety coating in accordance with the invention as might be needed for diverse uses and environments.

The invention is particularly directed to the safety coating of relatively thin-walled decanters made of borosilicate glass, such as are used in hot beverage handling, where the temperature fluctuations require that the interior surface and exterior surfaces do not expand at substantially different rates and cause unwanted fracturing during rapid heat fluctuations. Therefore, the protective coating is relatively thin to take into account the coefficient of expansion when used with intermittenly heated containers.

BRIEF DESCRIPTION OF THE DRAWINGS

Other objects and advantages of the invention will become apparent upon reading the following detailed description and upon reference to the accompanying drawings showing a specific embodiment thereof wherein:

FIG. 1 is a perspective view of a glass decanter with safety coating in accordance with the invention; and, FIG. 2 is a sectional view of the glass decanter of FIG. 1 taken along line 2—2 looking in the direction of the arrows.

DETAILED DESCRIPTION OF THE INVENTION

In the figures, the preferred embodiment of a glass container in line with the invention is disclosed by a glass coffee decanter 10 having a conventional shape. The coffee decanter 10 is useful for receiving hot coffee from, for example, an automatic brewer wherein the brewed coffee is introduced usually at a temperature of around 190° F. The coffee decanter 10 is adapted to be positioned on a heated warming plate for maintaining the cofffee inside at a desirable temperature between servings.

The decanter 10 has a wide bulbous glass bowl lower portion 11 that terminates upwardly at a narrowed neck portion 12 having an upper opening 13. Around the neck 12, an integrally molded collar 14, having a spout 15 and a handle 16, is interlocked to the decanter 10 as accomplished in the invention described in U.S. Pat. No. 4,090,648.

For typical use in restaurants, the glass portion of the decanter 10 preferably is an annealed blownware, borosilicate glass having a low coefficient of thermal expansion and possesses the thin wall thickness characteristic of the blowing process whereby to be sufficiently heat resistant to endure thermal stresses normally encountered in beverage service. Decanters like the decanter 10, having the standard glass bowl design, are usually provided to users with accompanying instructions for use, care and cleaning. Nonetheless, breakage due to carelessness and boiling the decanter dry caused by inattentiveness still occurs.

In order to protect the decanter 10 against breaking and to eliminate shattering in the event of breakage, a safety coating 17 is applied to the glass bowl, for example by dipping or spraying, to cover substantially the entire exterior surface of the decanter 10. In the exemplary embodiment, the coating 17 extends upwardly on the neck 12 to terminate underneath the collar 14. As shown in the cross sectional view of FIG. 2, the coating 17 has a substantially uniform thickness throughout.

In the illustrated embodiment, the safety coating 17 is a rubbery, heat stable plastic material capable of enduring temperature changes over a wide range without deterioration. In the preferred embodiment the plastic safety coating is preferably a silicone rubber that is made by compounding silicone elastomers with fillers and vulcanizing agents. The silicone rubber material is elastic and resilient to guard against glass breakage, but if breakage occurs, the glass bowl does not shatter because the fragments of glass are maintained inside an elastic envelope or "bag" formed by the coating 17. Silicone rubber is well-suited for use as the safety coating since it is characterized by its resistance to heat and is serviceable in a temperature range of from about −100° F. to a maximum temperature in excess of 500° F. This heat stability is important so that the coating does not warp, crack or delaminate when used on containers that undergo quick temperature changes. Silicone rubber also provides a transparent coating for the glassware and is resistant to discoloring from elevated temperatures and from aging. Accordingly, it is very suitable for use in the food industry to maintain cleanliness and esthetic appeal as well.

For ease of explanation, the thickness of coating 17 in the drawings is exaggerated in comparison to the thickness of the decanter 10. It should be understood that the glass wall has a much greater thickness than the coating 17. The decanter 10 is formed to have an increasing wall thickness from the top to the bottom. In the exemplary embodiment the wall has a minimum glass thickness of about 0.045 inches. The coating 17 has an optimal thickness in the range of from about 4 to 8 mils (0.004 inches to 0.008 inches) to best achieve the objects of the invention. Because of the requirement for the coating to endure large or rapid thermal changes, the upper limits for the thickness of the coating 17 are controlled by the coefficient of expansion of the coating material. Likewise, the thickness of the glassware is mainly controlled by the glass composition coefficient of expansion. Borosilicate type blowing glass is widely used for coffee decanters, and the like. In the disclosed example the decanter 10 comprises Corning Glass Specification No. 41087, borosilicate 7740 (annealed) glass. This type glass has a coefficient of expansion of 0.00000181 in./in./° F., which provides a very small amount of expansion during heating. The decanter 10 is formed to have a very thin wall throughout, which further provides for a limited expansion differential between the interior and exterior surfaces during rapid heat temperature changes. The thickness of an annealed glass container is a very important factor in determining its mechanical strength, i.e. impact resistance. In general, the strength increases in proportion to the square of the thickness of the glassware wall. Conversely, the thermal shock resistance is an inverse function of the thickness. Therefore, as the wall thickness goes up, the thermal shock resistance decreases. A wall thickness for the decanter 10 having a minimum of 0.045 inches, as stated above, and a maximum of about 0.165 inches, provides a container that survives both thermally and mechanically as a coffee decanter.

It is desirable for the coefficient of expansion of the coating 17 to be generally near that of the glass so that the inner surface against the glass and the exterior surface of the coating do not experience such radically different expansion levels that would cause delamination of the coating from the glass, rupturing of the coating surface, or the trapping of air bubbles under the coating surface. Coffee decanters are often plunged into cold water for cleaning while the decanter may still be quite hot from resting on a warming plate. The coating 17 can withstand this thermal shock, which might be a change of several hundred degrees (F.°), without warpage or delamination.

The decanter 10 is made to steadily rest on flat surfaces by being formed with a centrally concave bottom wall 18 which is covered by a bottom portion 19 of the coating 17. A ring-like portion 20 of the shape is thus formed and the overlying part of the coating portion 19 therefore directly abuts a warming plate, or the like, when the decanter is being warmed. The most severe temperature increase occurs at the interface between the ring-like portion 20 and the warming plate. The maximum thickness of the decanter 10 is provided at the bottom 19 in a range of from about 0.070 inches to about 0.165 inches in the disclosed embodiment.

Inattention by users may cause a decanter to remain on a warming plate until it boils dry. This condition weakens the glass wall of the container. The longer the container is left in that condition, the weaker, i.e. a lessening of shock resistance, it becomes. Even a slight accidental bump of such a weakened decanter against another decanter, for example, may cause it to break and shatter.

Test samples of coffee decanters in accordance with the invention were made having a first set coated with a 5 mil thickness of silicone rubber and second set of decanters coated with a 7 mil thickness of silicone rubber. Both sets were placed on standard warmer units made by the assignee Bloomfield Industries, Inc., identified as Model No. 8720, and having 100 watt capacity, which can create from about 500° to about a 550° F. surface temperature. The coffee decanters were left for a minimum of 8 hours and then tested for breakage resistance. This heat test simulated this common occurrence in a restaurant environment where an employee inadvertently permits a coffee decanter, without coffee in it, to rest on a warming plate in a "boil dry" condition and hereafter such a decanter is used for a subsequent brew of coffee. As noted above, glass weakens when left in this condition too long.

The 5 and 7 mil test decanters were then subjected to a standard impact test procedure using an American Glass Research, Inc. pendulum impact tester model number 6007000. This device utilizes a pendulum weight of 1.35 pounds and a radius of strike of 119/16 inches. A desirable shattering value for normal non-coated coffee decanters is 30 inches per second of acceleration without rupturing. Unexpectedly, the test specimens far exceeded these goals and achieved impact resistance in a range of from a minimum 75 to a maximum 90 inches per second of impact without rupturing. At higher rates of impact, exceeding about 90 inches per second on average, the glass decanters broke but the elastomeric skin did not rupture and prevented fragmenting by containing the broken glass within the elastomeric skin. These highly beneficial results will be appreciated by those skilled in the art as offering to the food services industry a safety coating far exceeding normally expected impact strengths which can be attained following a severe boil dry treatment of the coated decanter.

An additional benefit has been discovered in the utilization of a silicone rubber coating. The coating provides a rubber-like, non-slip surface which aids the employee in gripping and holding the decanter 10, such as when it is being washed or stored. Also, the rubbery gripping texture allows for secured positioning atop a coffee warmer plate, or when momentarily placed upon a countertop surface or the like. The outer skin surface of the protective coating 17 is not however rough to the touch, but has a surface texture made up of minute peaks and valleys apparently inherent in applying a coating of silicone rubber. This gripping property enhances safety while also allowing for sure handling of the decanter.

In summary, a safety coating for a glass container has been provided that is technically feasible and economically advantageous for application with a wide variety of glass containers for hot liquids, which containers may be subject to intermittent periods of rapid heating and cooling. The safety coating is provided by a plastic material, preferably a silicone rubber having elastomeric qualities which prevents the glassware from shattering when broken by preventing shards of fragmented glass from being strewn about. The coating may be subjected to intense heat, such as when a container is left in a "boil dry" condition on a warming unit, and still provide the shatter resistant qualities desired despite such abuse. Substantially the entire exterior surface of a glass container can be coated to prevent shattering at any location thereon. The inherent rubbery texture of the coating provides the additional benefit of an improved gripping surface for glassware. It will be clear to those in he art that the limiting of injuries resulting from glass breakage, and from spilling the hot liquids, is a great advance in safety protection. Only a minor increase in cost is incurred by providing the protective coating on glass containers.

What is claimed is:

1. Coated glassware having improved resistance to breakage and shattering comprising:

a decanter for holding a volume of liquid during heating thereof, said decanter having a wall thickness in the range of from about 0.045 inches to about 0.165 inches, having a generally bulbous shape, and made from borosilicate glass, a silicone rubber safety coating substantially covering the complete exposed exterior surface of said decanter and having no covering layer thereover, the safety coating being under tension and having a substantially uniform thickness of from about 4 mils to about 8 mils and providing shatter resistant containment for said decanter upon breakage, and wherein said safety coating is heat stable up to at least about 500° F.

2. Coated glassware as claimed in claim 1 wherein said silicone rubber is compounded with suitable fillers and vulcanizing agents and provides a rubbery property.

3. Coated glassware as claimed in claim 1 having an impact resistance of a minimum of 70 inches per second measured by using a pendulum weight of 1.35 pounds moving in a radius to strike of 1 19/16 inches.

4. Coated glassware as claimed in claim 1 exhibiting at least twice the impact strength of an uncoated decanter measured after said decanter has rested on a warming plate having a surface temperature of up to 500° F. for period of 8 hours without liquid in the decanter.

* * * * *

UNITED STATES PATENT AND TRADEMARK OFFICE
CERTIFICATE OF CORRECTION

PATENT NO. : 4,860,906
DATED : August 29, 1989
INVENTOR(S) : Louis Pellegrini and Melvin F. Roberts It is certified that error appears in the above-identified patent and that said Letters Patent is hereby corrected as shown below:

In Column 2, line 54, please delete the number "4,351,573" and insert therefor -- 4,315,573 --.

In Column 5, line 30, please delete the word "blowing" and insert therefor -- blown --.

In Column 6, line 38, please delete the number "119/16" and insert therefor -- 11 9/16 --; "of" (second occurrence) should be --to--

In Column 7, line 19, please delete the word "he" and insert therefor -- the --.

In Column 8, line 21, please delete the number "119/16" and insert therefor -- 11 9/16 --.

Signed and Sealed this

Twenty-fourth Day of April, 1990

*Attest:*

HARRY F. MANBECK, JR.

*Attesting Officer*   *Commissioner of Patents and Trademarks*